United States Patent [19]

Sabalvaro, III et al.

[11] Patent Number: 5,090,439

[45] Date of Patent: Feb. 25, 1992

[54] ATMOSPHERIC COMPENSATING AUTOMATIC AIR RELEASE VALVE

[75] Inventors: Vincent M. Sabalvaro, III; Ralph DiLorenzo, Rolling Meadows, both of Ill.

[73] Assignee: APCO Valve and Primer Corporation, Schaumburg, Ill.

[21] Appl. No.: 383,437

[22] Filed: Jul. 24, 1989

[51] Int. Cl.⁵ .............................. F16K 31/26
[52] U.S. Cl. ..................... 137/202; 137/450
[58] Field of Search ............ 137/202, 196, 450

[56] References Cited

U.S. PATENT DOCUMENTS

| | | | |
|---|---|---|---|
| 462,798 | 11/1891 | Hussey | 137/196 |
| 1,856,105 | 5/1932 | Marden . | |
| 2,425,070 | 8/1947 | Nicolette | 137/202 |
| 2,673,618 | 3/1954 | Batchelder . | |
| 2,745,511 | 5/1956 | Berck . | |
| 2,811,219 | 10/1957 | Wenzl | 137/202 X |
| 2,938,531 | 5/1960 | Berck . | |
| 3,054,419 | 9/1962 | Farrell . | |
| 3,232,313 | 2/1966 | Bering | 137/450 |
| 4,011,884 | 3/1977 | Drori . | |
| 4,164,955 | 8/1979 | Allen . | |

*Primary Examiner*—Alan Cohan
*Attorney, Agent, or Firm*—Cushman, Darby & Cushman

[57] ABSTRACT

An automatic air release valve which is viable to operate at any pressure. The air release valve includes a first orifice for exhausting air and a second orifice which is exposed to atmosphere but is always sealed. The second orifice exposes a vertically movable stem within the valve to forces which are equal and opposite to a suction force which tends to hold the valve stem in sealing relation to the first, air exhaust orifice. Because of the equalization of pressures made possible by the provision of first and second orifices, movement of the valving mechanism within the valve housing downwardly as the liquid level goes down causes the air vent orifice to open irrespective of the pressure within the valve.

6 Claims, 1 Drawing Sheet

ATMOSPHERIC COMPENSATING AUTOMATIC AIR RELEASE VALVE

BACKGROUND OF THE INVENTION

1. Field of the Invention

The present invention relates to air release valves and, more particularly, to an atmospheric compensating automatic air release valve.

2. Description of the Related Art

A typical automatic air release valve is normally open when installed so that air can be vented to atmosphere through an air release orifice. As the system is filled with water and liquid enters the automatic air release valve, the float mounted therewithin is raised and activates the mechanism to shut the air release orifice. When the orifice is shut, the air release valve becomes pressurized. The orifice remains closed until such time as air bubbles enter the air release valve and displace the water therewithin. Once the water is displaced, the mechanism and float are no longer submerged. A suction force due to the pressure differential between the interior of the valve housing and atmosphere tends to hold the mechanism in sealing relation to the air release orifice. However, such valves are designed so that the combined weight of the mechanism and the float is sufficient to open the orifice against the internal pressure. The size of the air release orifice determines, for a given valve mechanism, the maximum pressure with which the valve will operate.

Thus, typical automatic air release valves have a specific high pressure limit up to which point they will open and allow entrapped air to escape. Beyond the high pressure limit, the typical automatic air release valve will not open. Therefore, once the size of the air release valve body and internal valving mechanism have been designed for a specific operating pressure or pressure range, the only way that the operating pressure can be changed is by changing the size of the air release orifice.

This functionally limiting characteristic of conventional air release valves requires that when design engineers specify air release valves for their pipeline, they select one which will satisfy the highest pressure anticipated in the pipeline and will ignore the fact that there are a variety of lesser pressures in line. In doing so, the advantages of using a variety of orifices to gain maximum venting capacity at each high point is sacrificed. Indeed, the higher the operating pressure to which the air release valve is exposed, the smaller orifice employed. If a conventional air release valve is employed in line and selected in anticipation of the maximum pressure in the entire line, then the air release valves will necessarily have a relatively small orifice and thus relatively low air venting capacity irrespective of the fact that at certain points along the line the maximum pressure would be far lower than the maximum for the entire line.

It would be desirable, therefore, to provide an air release valve having an unlimited operating pressure range without having to change the size of the valving mechanism and/or the size of the air release orifice so that advantage can be taken of maximum venting capacity.

SUMMARY OF THE INVENTION

It is an object of the present invention to provide an air release valve having a structure such that the operating pressure can be changed without changing the valve mechanism or the size of the air release orifice. More particularly, it is an object of the invention to utilize atmospheric pressure to allow an unlimited range of operating pressures and air orifice sizes without changing internal weights, levers and the like.

It is yet another object of the invention to provide a valve structure which does not utilize transport, bellows, pilots nor require an extra flow port or orifice to operate.

It is a further object of the invention to provide an air release valve which is compact in size but derives an increased venting capacity as compared to conventional air release valves of comparable size.

The foregoing objects are realized in accordance with the present invention by providing a valve including a second orifice which is exposed to atmosphere but always shut whereby a valve mechanism in the valve is exposed to forces which are equal and opposite to a suction force which tends to hold the valve mechanism in sealing relation to the first, air relase orifice. By providing first and second orifices in accordance with the present invention, then, movement of the valve float downwardly as the liquid level goes down will cause the air vent orifice to open irrespective of the pressure within the valve. Thus, the automatic air release valve provided in accordance with the present invention is capable of operating under virtually unlimited pressures.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

Figure 1:
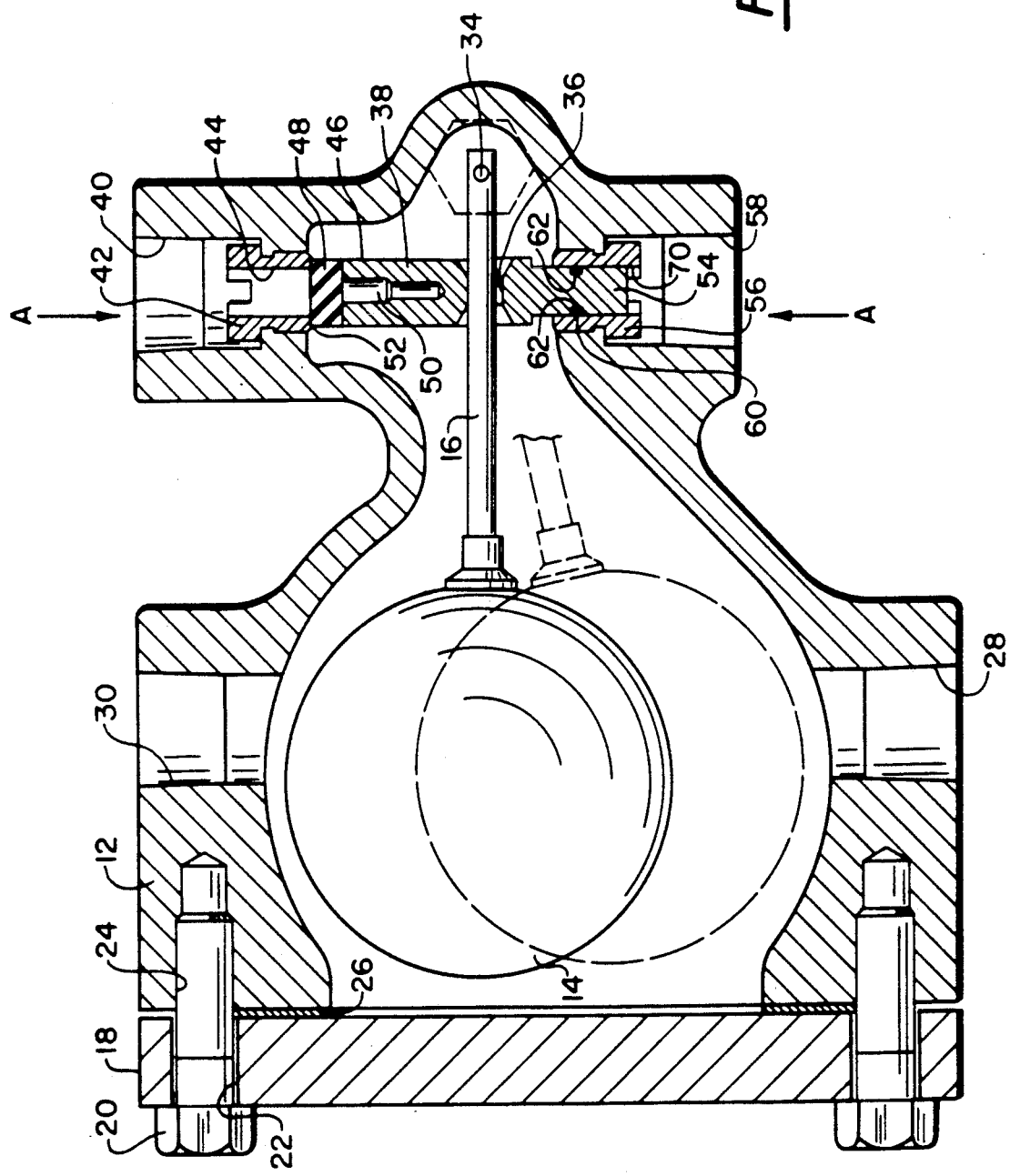
FIG. 1 is an elevational view, partly in cross-section, of an air release valve provided in accordance with the present invention.

An air release valve 10 provided in accordance with the present invention is shown in FIG. 1. As can be seen, the valve 10 includes a main body in the form of a housing 12 defining a hollow interior for receiving a float 14 and float lever 16 as described more fully below. A cover plate 18 is removably mounted to the housing 12 with a plurality of cover bolts 20 inserted through apertures 22, 24 defined respectively in the cover plate 18 and in the valve housing 12. A cover gasket 26 is mounted intermediate the cover plate 18 and valve housing 12 to provide a fluid-tight seal therebetween.

The interior of the valve housing 12 is fluidly coupled to the line of the system through aperture 28. In the illustrated embodiment, another aperture 30 may be defined vertically above aperture 28 and is plugged in use with a suitable plugging device or may communicate with a further flow line, valve or the like (not shown).

A float 14 and float lever 16 are pivotally mounted to the valve housing 12 by a pivot pin or the like 34 so that the float 14 is vertically pivotable about pivot point 34 within the interior of the valve housing 12. Float lever 16 extends through an aperture 36 defined through a needle stem 38 which is mounted within the valve housing 12. The needle stem 38 is vertically movable in the valve housing 12 as described more particularly below.

Air is vented from the valve housing through air venting aperture 40. A fixed hollow bushing 42 is mounted within aperture 40, and has an orifice 44 defined therethrough through which air being vented may pass. A first end 46 of the needle stem 38 has a rubber valve element 48 attached thereto by a suitable bolt element or the like shown schematically at 50. The rubber valve element 48 engages the sealing face 52 of the fixed hollow bushing 42 to prevent the exhaustion of air from the valve housing 12 as described more particularly below.

The second, vertically lower end 54 of the vertically movable needle stem 38 is slidably disposed within a fixed bushing 56 mounted in yet another aperture 58 defined through the wall of the valve housing 12. An O-ring or similar sealing element 60 is preferably mounted in a 62 groove defined in the needle stem as shown or in a groove (not shown) defined in the fixed bushing 56 or both to provide a fluid-tight seal between the needle stem 38 and the fixed bushing 56.

The operation of the air release valve provided in accordance with the present invention will now be described with reference to the drawing figure. Initially, the float 14 and float lever 16 are in the disposition shown in phantom lines in the drawing figure. In this position, the valve or needle stem 38 is in its vertically lowermost position. Further movement of the valve stem in a vertically downward direction is prevented by the engagement of the float lever 16 and the walls of the corresponding opening 36 in the needle stem 38 and further by the engagement of, for example, a circumferential shoulder 64 defined by first and second diameter portions 66, 68 of the stem 38. In the alternative, a flange can be mounted to the stem 38 so as to extend radially therefrom to provide an abutment surface. Limiting movement of the needle stem 38 ensures that the O-ring or similar elastomeric element 60 maintains a fluid-tight seal between the needle stem 38 and the fixed bushing 56.

As the system is filled with a liquid such as water and the liquid enters the valve 10 of the invention, the liquid raises the float 14 within the housing 12. As the float 14 is lifted, the float lever 16 pivots about pivot point 34. At the same time, the float lever 16 engages the vertically upper surface of the orifice 36 defined through the stem 38 and urges the needle stem 38 upwardly. Once the liquid has raised the float 14 to the position illustrated in solid lines in the drawing figure, the rubber valve element 48 attached to the stem 38 is urged into engagement with the sealing face 52 of the fixed bushing 42 to prevent the flow of liquid through orifice 44.

When the needle stem 38 is in its vertically upper position, the upper surface of the rubber valve element 48 is exposed-to atmospheric pressure as shown by arrow A adjacent the first end of stem 38. Similarly, the second end 54 of the needle stem 38 is exposed to atmospheric pressure as shown by arrow A adjacent the second end 54 of stem 38 through the orifice 70 defined in the fixed bushing 56 although the orifice 70 itself is sealed by the second end 54 of the stem. Likewise, at each orifice 44, 70, the respective end 46,54 of the stem 38 is exposed to the internal pressure of the valve housing 12. Thus, the ends 46, 54 of the vertically movable stem are exposed to forces which are equal and opposite. More particularly, the provision of the second orifice 70 which is exposed to atmosphere but is always shut by the slidable stem 38 within the bushing 56 exposes the vertically movable stem 38 to forces which are equal to and opposite to the suction force which would otherwise tend to hold the rubber valve element 48 in sealing relation to the bushing 42 defining the first orifice 44 when the air release valve is pressurized. Accordingly, when air bubbles enter the air release valve housing 12 and displace the water therewithin, the valve stem will simply move downwardly with the float lever 16. There is no suction force at air release orifice 44 to be overcome. Thus, air can again be exhausted from orifice 44 irrespective of the pressure within the valve 10.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. An automatic air release valve comprising:
   a valve housing;
   a first aperture defined in said housing for fluidly coupling the interior of said housing to a fluid flow line;
   an air release orifice defined through a wall of said housing;
   valve means mounted within said housing for closing said air release orifice when fluid reaches a predetermined level within said housing;
   atmospheric compensation means for operatively exposing said valve means to atmospheric pressure at a point remote from said air release orifice; said atmospheric compensation means comprising a second orifice defined through a wall of said housing at a location remote from said air release orifice and means for operatively exposing said valve means to atmospheric pressure at said second orifice, and said valve means comprising a float valve mechanism operatively coupled to a needle valve stem, said needle valve stem having first and second longitudinal ends, said first longitudinal end selectively engaging said air release orifice so as to open and close said air release orifice in response to movement of said float valve mechanism, said second longitudinal end of said needle stem engaging and sealing said second orifice, said second end of said needle stem being exposed to atmospheric pressure through said second orifice,
   whereby the operation said valve means is independent of the size of said air release orifice.

2. An air release valve as in claim 1, wherein said float valve mechanism includes a float element and a float lever, said float lever extending through an opening defined in said needle valve stem, said float lever being pivotally mounted to said valve housing.

3. An air release valve as in claim 1, wherein said float valve mechanism is pivotally mounted to said housing for vertical movement within said housing with a level of fluid in the housing, upward pivotal movement of said float valve mechanism urging said needle valve stem into engagement with said air release orifice, the weight of said float valve mechanism drawing said needle valve stem away from said air release orifice once fluid within the housing has subsided, said needle valve stem being slidably engaged with said second orifice so as to close said second orifice during said vertical movement of said needle valve stem.

4. An air release valve as in claim 3, wherein an O-ring sealing element is disposed between said valve stem and said second orifice so as to provide a fluid tight seal therebetween.

5. An atmospheric compensating automatic air release valve comprising:
- a valve body including a valve housing and a cover plate fixed thereto;
- a fluid inlet aperture defined through a wall of said valve housing;
- a first, air release orifice defined through a wall of said housing;
- a float valve mechanism pivotally mounted to said valve housing, said float mechanism including a float element and a float lever fixedly coupled at a first end thereof to said float element and pivotally coupled at a second end thereof to said housing, said float mechanism being operatively coupled to a valve stem element for selectively engaging and sealing said air release orifice in response to pivotal moment of said float lever; and
- a second orifice defined through a wall of said housing, a second end of said valve stem element being slidably engaged with said second orifice for closing the same, said second end of said needle stem being exposed to atmospheric pressure through said second orifice;
- whereby said second end of said valve stem element is exposed to a force which is equal and opposite to a suction force tending to hold said valve stem in sealing relation to the air release orifice so that said air release orifice is opened by said float valve mechanism and stem combination irrespective of the pressure within said valve housing.

6. An air release valve as in claim 5, wherein an O-ring sealing element is disposed between said valve stem and said second orifice so as to provide a fluid tight seal therebetween.

* * * * *